United States Patent [19]

Phillips, II

[11] Patent Number: 4,735,554
[45] Date of Patent: Apr. 5, 1988

[54] SELF-REGULATING DEICER VALVE

[75] Inventor: Ronald W. Phillips, II, Mogadore, Ohio

[73] Assignee: The B.F. Goodrich Company, Akron, Ohio

[21] Appl. No.: 832,186

[22] Filed: Feb. 24, 1986

[51] Int. Cl.⁴ .......................... F04F 5/52; B64D 15/16
[52] U.S. Cl. ...................................... 417/189; 137/114; 244/134 A; 417/187
[58] Field of Search ................. 417/187, 189; 244/134 A; 137/505, 505.39, 510, 114, 605; 251/63.4

[56] References Cited

U.S. PATENT DOCUMENTS

| | | | |
|---|---|---|---|
| 1,636,919 | 7/1927 | Miller | 137/505 |
| 2,457,388 | 12/1948 | Lung | 417/189 X |
| 2,642,813 | 6/1953 | Woodruff et al. | 417/189 X |
| 2,753,138 | 7/1956 | MacIntyre | 244/134 A |
| 3,845,932 | 11/1974 | Fontaine | 251/63.4 |
| 4,089,622 | 5/1978 | Anbel et al. | 417/189 X |
| 4,228,958 | 10/1980 | Perry | 137/114 X |
| 4,482,299 | 11/1984 | Eulass | 417/187 X |

FOREIGN PATENT DOCUMENTS 402850 12/1933 United Kingdom ................ 137/505

Primary Examiner—Martin P. Schwadron
Assistant Examiner—Stephen M. Hepperle
Attorney, Agent, or Firm—Joseph Januszkiewicz

[57] ABSTRACT

A self-regulating vacuum control valve with a needle valve operating in a narrow central bore that regulates the flow of pressurized air from a pressure source into such narrow central bore for passage and discharge from an enlarged bore. A vacuum is pulled in passageways in such enlarged bore which exert a vacuum pull on a control chamber and on one end of a diaphragm means. The diaphragm means is connected to the needle valve and has its one end subjected to atmospheric pressure. Such diaphragm and needle valve are spring biased to increase the air flow past such needle valve in opposition to the vacuum pull on such diaphragm. Such spring bias is adjustable to provide a predetermind vacuum pull on the control chamber that can be connected to a deicer pad for maintaining a predetermined vacuum pull thereon.

5 Claims, 3 Drawing Sheets

SELF-REGULATING DEICER VALVE

BACKGROUND OF THE INVENTION

This invention relates to a control valve for use in automatically controlling the vacuum as in a deicer pad.

Deicer pads are inflatable or resilient extensible units mounted as shoes or pads upon the leading edges of an airplane airfoil and are used for the purpose of preventing the accumulation of ice on the airfoils.

In the control of such deicer pads, many systems have employed extensive complicated air conduits supplied with pressurized air and thence having a vacuum pulled therethrough wherein the operation is repeated numerous times. The pulling of a vacuum is achieved by a vacuum pump operating in conjunction with a motor-driven distributor valve which supplies air under pressure to the deicer pad. The present invention is directed to a novel valve which automatically adjusts to produce a preset level of vacuum which has the advantage of operating with a minimum of compressed air, regardless of the pressure, thus drawing less power when less flow is needed to maintain a vacuum.

SUMMARY OF THE INVENTION

A self-regulating vacuum valve for use in maintaining a vacuum on the inflatable tubes of a deicer pad wherein the valve automatically adjusts to produce a certain level of vacuum on a minimum of pressurized air flow regardless of its pressure. In the regulating valve, a pressurized air flow across bores that lead to a cavity and a deicer pad maintain a vacuum thereon as a needle valve controls such pressurized air flow via its connection to a diaphragm means whose opposing chambers are connected to the cavity for a vacuum pull and to atmosphere. Adjustable spring biasing means presets the needle valve's control.

DETAILED DESCRIPTION

Figure 1:
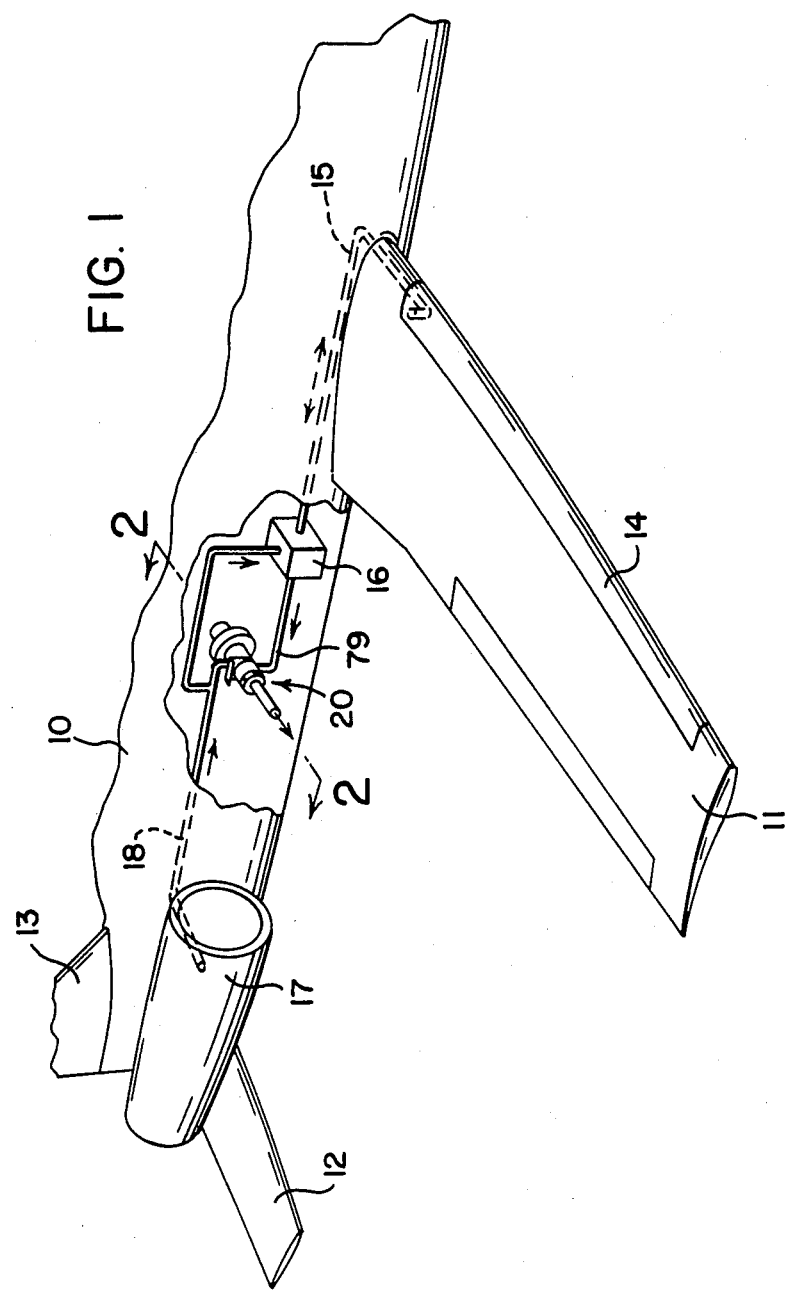
FIG. 1 is a perspective view of a portion of an aircraft with a pneumatic deicer mounted upon the leading edge of a wing with a schematic showing of the flow of air from the turbine to a control valve which regulates the pulling of a vacuum on the deicer pad.

Referring to the drawings wherein like reference numerals designate like or corresponding parts throughout the several views, there is shown in FIG. 1 a portion of an airplane's fuselage 10 with a wing 11, a tail wing with a horizontal stabilizer 12 and a vertical stabilizer 13. The wing 11 has an inflatable deicer pad 14 mounted on the leading edge thereof suitably connected via a conduit 15 to a deicer control valve means 16. A turbine 17 (only one shown) is suitably attached to the fuselage 10 and has conduit 18 connected thereto for bleeding off a small portion of pressurized air for delivery to a self-regulatory control valve 20.

The deicer pad 14 is constructed of an elastic rubber-like material suitably reinforced and secured to the leading edge of wing 11 in a manner old and well known in the art. Such deicer pad has a plurality of inflatable tubes therein connected via a manifold to the conduit 15 via which the deicer is distended or connected to a vacuum which maintains the deicer pad in a deflated condition to facilitate the smooth flow of air thereover.

Figure 2:
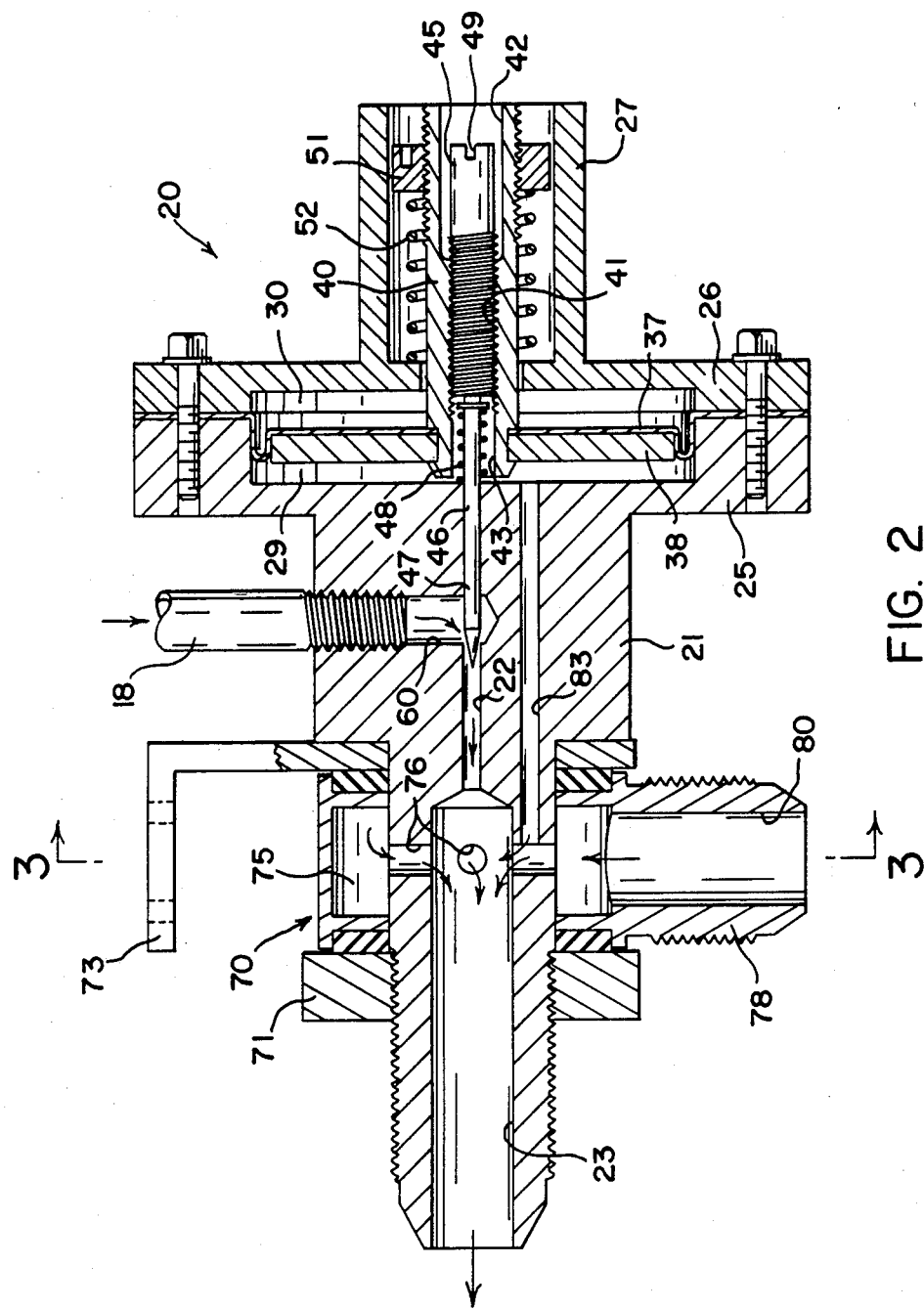
FIG. 2 is a cross sectional view of the control valve for regulating the vacuum taken on line 2—2 of FIG. 1.
Figure 3:
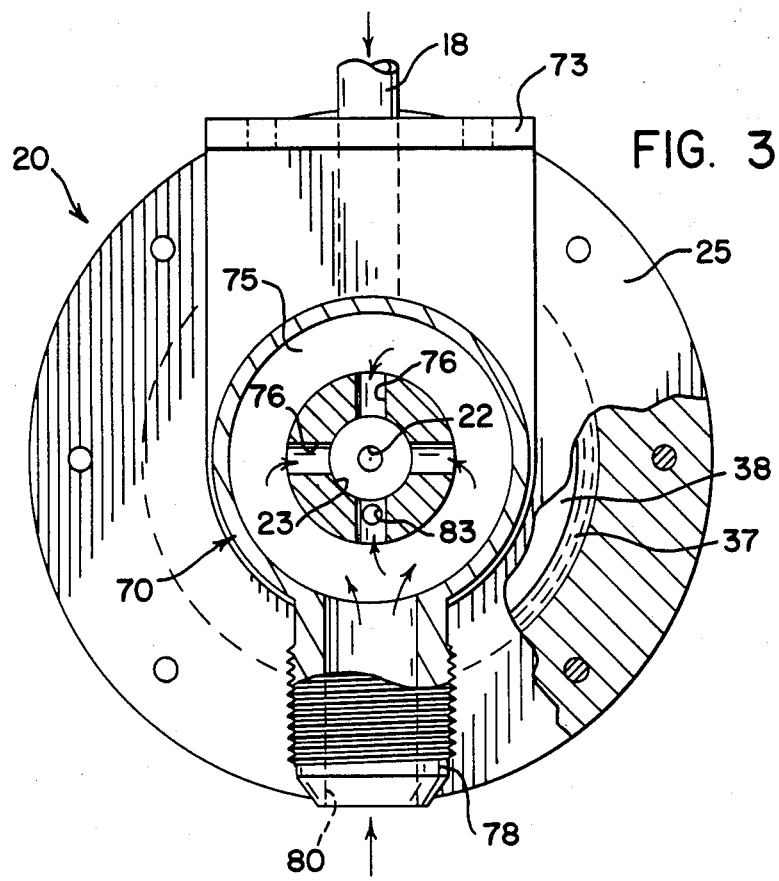
FIG. 3 is a cross sectional view of the control valve taken on line 3—3 of FIG. 1.

As seen in FIG. 2, the control valve 20 has an elongated cylindrical housing 21 with a central bore 22 communicating with a large diameter central bore 23 coaxially therewith. The one end of housing 21 has a flanged portion 25 that cooperates with a flanged portion 26 of a second housing 27 to define a chamber that is divided into a first chamber 29 and a second chamber 30 by the clamping action of such flanges when a circular diaphragm 37 is inserted therebetween. The diaphragm 37 is suitably attached to a rigid annular shaped piston 38 whose central bore portion suitably receives a sleeve 40 that captively receives such diaphragm 37 and piston 38 for movement therewith. Sleeve 40 has a stepped central bore with a threaded intermediate portion 41, an enlarged bore portion 42 at one end and a reduced bore portion 43 at the other end. A threaded plug 45 is suitably threadedly connected to the intermediate threaded bore portion 41 within sleeve 40. The one end of plug 45 is in abutting engagement with a stem 46 of a needle valve 47 received within central bore 22 of housing 21.

A compression spring 48 captively encompassing the stem 46 of needle valve 47 and urges needle valve 47 rightwardly as viewed in FIG. 2 for engagement with the plug 45 for a purpose to be described. One end of spring 48 engages the sidewall in first chamber 29 on flange 25 while the other end of spring 48 engages a washer on the stem 46. Plug 45 has a slot 49 to provide means for adjusting the compression on spring 48 by moving such plug axially in view of its threaded connection within sleeve 40. The exterior one end of sleeve 40 has an annular disc 51 threadedly mounted thereon to engage one end of a compression spring 52 that encompasses the intermediate portion of sleeve 40. The other end of compression spring 52 is seated on the flanged portion 26 thus urging diaphragm 37 and piston 38 rightwardly as viewed in FIG. 2 along with plug 45. Chamber 30 is connected to atmosphere via a clearance space past sleeve 40 and the clearance space around the periphery of annular disc 51 in the central bore of housing 27.

The intermediate portion of cylindrical housing 21 has a bore 60 that communicates with central bore 22 adjacent needle valve 47. The upper portion of bore 60 is threaded to receive the one end of conduit 18 which, as previously described, is connected to a high pressure source of air, as bleeding off a small portion of pressurized air from the turbine 17.

Mounted on the other end of housing 20 is an annular housing 70 which is held in place thereon by a threaded collar 71. Collar 71 is threaded onto the external threads on such other end portion of housing 21. A bracket 73 may be similarly retained on such housing 20 with the clamping action of annular collar 71. Annular housing 70 has an annular chamber 75 in cooperation with cylindrical housing 21, which chamber 75 is connected via a plurality of circumferentially spaced bores 76 to the enlarged central bore 23. The lower end portion of annular housing 70 has a depending tubular portion 78 threaded exteriorly for connection to a conduit 79 (FIG. 1) and having a central bore 80 for communication with one of the circumferentially spaced bores 76. Elongated cylindrical housing 21 has a passageway 83 parallel to the central bore 22 for interconnecting chamber 29 with one of the bores 76 of the circumferentially spaced bores 76 in cylindrical housing 21.

In the operation of the above described self-regulating control valve 20, a small stream of high pressurized air is bled off from turbine 17 and directed via conduit 18 through bore 60 in the intermediate portion of housing 70 past needle valve 47 for passage into central bore 22 and thence into passageway or bore 23 for discharge into the atmosphere. As such high pressurized air flows past bores 76 in cylindrical housing 21, a vacuum is drawn or pulled from such plural bores 76 as well as from passageway 83 and bore 80. Bore 80 is connected via conduit 79 and control valve 16 to maintain a vacuum on the deicer pads as desired or to appropriate vacuum instruments. Passageway 83 is connected to chamber 29 thereby exerting a vacuum force on piston 38 and diaphragm 37, which force is opposed by springs 52 and 48. As the vacuum increases in proportion to the opposing forces of springs 52 and 48 and overcoming these spring forces, needle valve 47 will move leftwardly as viewed in FIG. 2 to decrease the amount of pressurized air flowing into central bore 22 from high pressure line 18, thereby decreasing the flow of high pressurized air past bores 76 which in turn decrease the vacuum pull on bores 76, which in turn decrease the vacuum in chamber 29. This action will cause the forces of springs 52 and 48 to move diaphragm 37 rightwardly as viewed in FIG. 2 which in turn will move needle valve 47 away from its restricting effect on the flow of highly pressurized air from bore 60 thus equalizing the forces on diaphragm 37. The amount of the vacuum forces can be adjusted for a given value by the rotation of plug 45 in sleeve 40 to adjust the value on spring 48 or to rotate disc 51 to adjust sleeve 40 and diaphragm 37 along with the position of needle valve 47 in central bore 22.

Various modifications are contemplated and may be resorted to by those skilled in the art without departing from the described invention as hereinafter defined by the appended claims as only a preferred embodiment thereof has been disclosed.

I claim:

1. A self regulating control valve having a housing with a bore extneding therethrough, a first passageway extending into said housing and communicating with said bore, said bore having a discharge opening for discharging air from said passageway passing through said bore, said first passageway connected to a high pressure air source, said housing having a chamber that receives a diaphragm means which divides said chamber into a first chamber and a second chamber, said diaphragm connected to a needle valve that is operative at the juncture of said first passageway with said bore to control the volume of flow of pressurized air from said passageway through said bore into said discharge opening to atmosphere, said second chamber connected to atmosphere, said housing having a cavity, a plurality of circumferentially spaced apertures connecting said bore with said cavity for exerting a controlled vaccum force on said apertures and said cavity in response to the volume of flow of pressurized air through said bore, said cavity connected to said first chamber via a second passageway to exert a vaccum force on said diaphragm, and spring means connected to said diaphragm for opposing the force of said vaccum, wherein said cavity is connected via a conduit to pneumatic deicers upon which a vaccum may be exerted, wherein said bore is a stepped bore, said stepped bore having a narrow intermediate bore portion that communicates with enlarged end portions, said needle valve received by said narrow intermediate portion, and said needle valve having a tapered end portion that is operative to regulate the flow of high pressure from said first passageway into said narrow intermediate bore portion.

2. A self-regulating valve as set forth in claim 1 wherein said diaphragm means includes a piston secured to a diaphragm and moveable therewith.

3. A self-regulating valve as set forth in claim 2 wherein one of said enlarged end bore portions of said stepped bore communicates directly with said discharge opening, said spring means includes a first spring mounted in the other one of said enlarged bore portions for biasing said diaphragm and piston in a direction to increase the flow of pressurized air into said narrow bore portion.

4. A self-regulating valve as set forth in claim 3 wherein said diaphragm means is connected to a sleeve that is linearly moveable in said other one of said enlarged bore portions, said sleeve having an adjustable disc mounted on one end remote from said sleeve connection to said diaphragm means, and said first spring encompassing said sleeve and having one end of said first spring seated on said disc and the other end of said first spring seated on a shoulder of said housing adjacent said diaphragm.

5. A self-regulating valve as set forth in claim 4 wherein said sleeve has a central bore, a plug threadedly mounted in said central bore and biased into engagement with said needle valve, said needle valve having a washer secured on one end adjacent said plug, and said spring means having a second spring encompassing said needle valve with one end of said second spring seated on said washer and the other end of said second spring seated on a shoulder formed at the juncture of said narrow bore portion with said other one of said enlarged bore portions to bias said needle valve to increase the flow of high pressurized air into said narrow bore to increase the vacuum pulled on said apertures and said cavity.

* * * * *